May 26, 1925.  J. T. FERGUSON  1,539,656
SHOCK ABSORBER
Filed Oct. 12, 1923
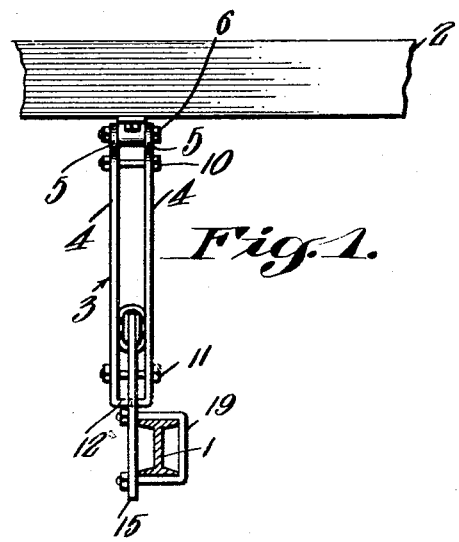
Fig. 1.
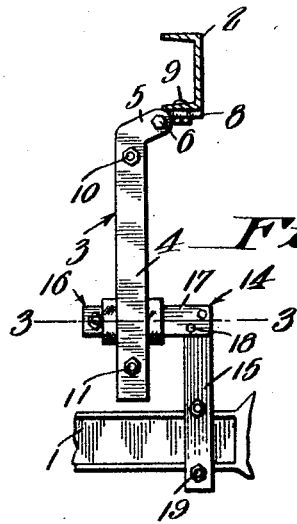
Fig. 2.
Fig. 3.
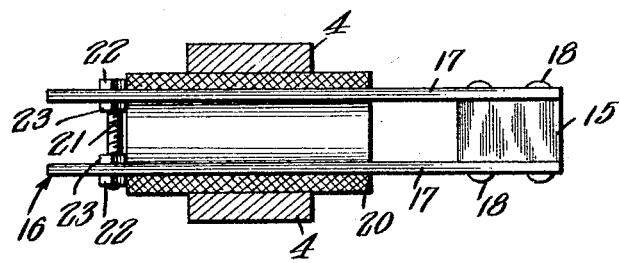
Fig. 4.
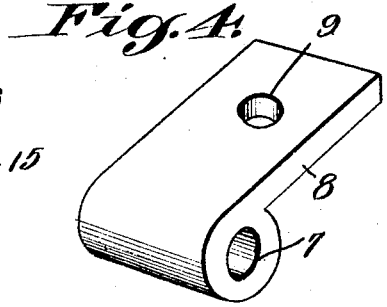
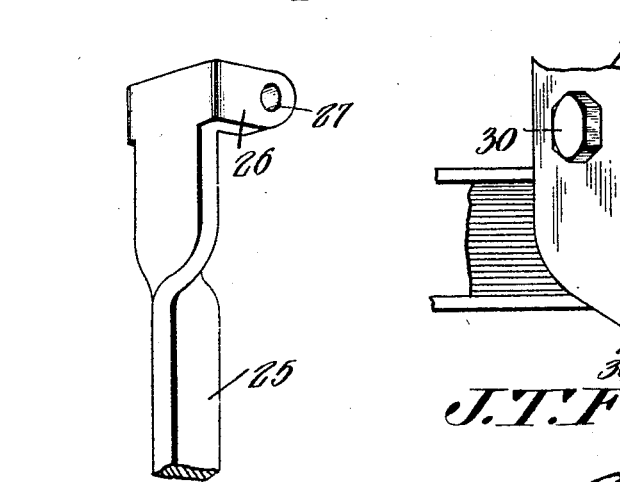
Fig. 5.
Fig. 6.
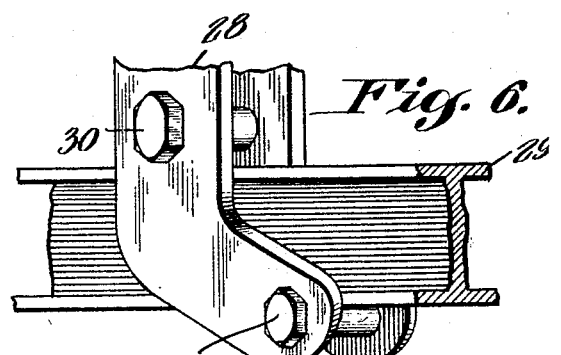
Inventor
J. T. Ferguson
By C A Snow & Co
Attorney Patented May 26, 1925.

1,539,656

UNITED STATES PATENT OFFICE.

JESSE TOM FERGUSON, OF MERIDIAN, MISSISSIPPI.

SHOCK ABSORBER.

Application filed October 12, 1923. Serial No. 668,152.

*To all whom it may concern:*

Be it known that I, JESSE TOM FERGUSON, a citizen of the United States, residing at Meridian, in the county of Lauderdale and State of Mississippi, have invented a new and useful Shock Absorber, of which the following is a specification.

This invention aims to provide a simple shock absorber which is so constructed as to be capable of ready adjustment to exert a greater or less effort in limiting the vertical movement of the running gear of a vehicle with respect to the body of the vehicle. Preferred forms have been shown, but these may be altered, within the scope of what is claimed without departing from the spirit of the invention.

In the drawings: Figure 1 shows in side elevation, a device constructed in accordance with the invention; Figure 2 is a front elevation; Figure 3 is a section on the line 3—3 of Figure 2; Figure 4 is a perspective of the bracket; Figure 5 is a perspective showing a modified attaching means; Figure 6 is a perspective showing a modified attaching means for use with the part shown in Figure 5.

The numeral 1 denotes a vehicle axle, and the numeral 2 marks the frame bar or any other suitable portion of the vehicle body. A compressible main member 3 is provided and is made up of metal parts 4 having some resiliency. The member 3 may be attached in any way to the frame bar 2 or other part of the vehicle. The parts 4 of the member 3 may terminate in angularly disposed arms 5 carrying an attaching element or bolt 6 received in an opening 7 formed in a bracket 8 secured at 9 to the frame bar 2. The parts 4 of the member 3 are connected by an upper compression device 10 and a lower compression device 11, the parts 4 being equipped with lower inturned abutting fingers 12.

The device comprises a compressible auxiliary member 14 of rectangular form and including a stem 15 and a head 16 disposed at right angles to the stem, the head being made up of resilient strips 17 attached by securing devices 18 to the upper end of the stem 15. The stem 15 extends across the axle 1 and may be connected thereto by a U-bolt 19 or in any other suitable way. The head 16 of the member 14 is surrounded by a loop shaped friction element 20, made of the material used in the construction of brake linings, or of any other suitable material, the friction element being received closely but slidably between the parts 4 of the main member 3. Means is provided for moving the strips 17 of the head 16 toward and away from each other thereby to vary the pressure exerted by the friction element on the parts 4, and, with this end in view, a bolt 21 extends through the outer ends of the strips 17, the bolt carrying outer nuts 22, and inner nuts 23, cooperating with the strips 17.

When relative movement between the axle 1 and the frame bar 2 takes place, the friction element 20, sliding with the strips 17 between the parts 4, will act as a shock absorber. By tightening the bolts 10 and 11, the upper and lower ends of the parts 4 may be drawn together, the result being that the friction element 20 will encounter considerable resistance at the ends of its stroke, and not so much resistance in the central portion of its stroke.

The device may be turned end for end from the position shown in Figure 2, any suitable means being provided for connecting the relatively removable members of the shock absorber to the axle and to the vehicle frame. Thus, in Figure 5, the stem 25, corresponding to the stem 15, may have ears 26 provided with openings 27 adapted to receive the attaching element 6 which is mounted in the opening 7 of the bracket 8, and the members 28, corresponding to the parts 4, may be placed on opposite sides of the axle 29, as in Figure 6, and be held on the axle by bolts 30, or otherwise.

I claim:—

1. A shock absorber comprising a main member having resilient parts located side by side and adjustably connected, and an auxiliary member L-shaped in form one arm of which is equipped with means for connecting it to a vehicle axle and the other composed of laterally spaced resilient members fixed to opposite sides of said axle connected arm and located side by side, a loop-shaped friction element surrounding said resilient members and received slidably and closely between the parts of the main member, and means for adjusting the free ends of the resilient members of said head toward and away from each other to vary the pressure exerted by the friction element on the main element.

2. A shock absorber comprising a main member having resilient parts located side by side and adjustably connected, and an auxiliary member L-shaped in form one arm of which is equipped with means for connecting it to a vehicle axle and the other composed of laterally spaced resilient members fixed to opposite sides of said axle connected arm and located side by side, a loop-shaped friction element surrounding said resilient members and received slidably and closely between the parts of the main member, a bolt adjustably connecting the free ends of the resilient members of said head and equipped with nuts for securing said ends in adjusted relation to each other, said bolt operating also as a retainer for the friction elements.

In testimony that I claim the foregoing as my own, I have hereto affixed my signature in the presence of two witnesses.

JESSE TOM FERGUSON.

Witnesses:
J. J. FERGUSON,
V. W. GILBERT.